United States Patent [19]

Wenzel

[11] Patent Number: 4,787,195
[45] Date of Patent: Nov. 29, 1988

[54] POWER LAWNMOWER WITH HYDROSTATIC DRIVE

[75] Inventor: Philip H. Wenzel, Vernon Center, N.Y.

[73] Assignee: Ferris Industries, Inc., Oneida, N.Y.

[21] Appl. No.: 63,007

[22] Filed: Jun. 17, 1987

[51] Int. Cl.$^4$ .................................................. A01D 69/06
[52] U.S. Cl. ..................................... 56/11.1; 56/11.3; 56/11.8
[58] Field of Search ........................ 56/11.1, 11.3, 11.8

[56] References Cited

U.S. PATENT DOCUMENTS

| | | | |
|---|---|---|---|
| 2,689,620 | 9/1954 | Hainke | 56/11.8 |
| 3,742,685 | 7/1973 | Lian | 56/11.1 |
| 4,326,368 | 4/1982 | Hoff | 56/11.3 |
| 4,558,558 | 12/1985 | Horner | 56/11.3 |

Primary Examiner—Douglas Hart
Attorney, Agent, or Firm—Wall and Roehrig

[57] ABSTRACT

A self-propelled lawnmower having a hydrostatic transmission and a differential mechanism to power the rear drive wheels which are situated behind a forward mowing deck. The hydrostatic drive has infinitely variable adjustment of speed from reverse, through neutral, to a maximum forward speed. There are independently actuated disc brakes for the rear drive wheels, with right and left brake levers situated adjacent the operator hand grips. The engine is situated with its center of gravity behind the drive wheel shaft to balance the weight of the mowing deck. The operator can control the speed and direction of the mower without removing his hands from the hand grips. By selecting actuation of the disc brakes, the machine can be effortlessly turned without a reduction in speed.

12 Claims, 2 Drawing Sheets

POWER LAWNMOWER WITH HYDROSTATIC DRIVE

BACKGROUND OF THE INVENTION

This invention relates to self-propelled institutional or commercial type lawn mowers, and is especially directed to large lawnmowers intended for extended service on a daily basis by commercial landscape gardeners or ground maintenance personnel responsible for attending to lawns at corporate or government office parks, golf courses, condominiums, and the like. The invention is especially directed to walk-behind and sulky-type riding mowers in which there is an operator position situated behind the mowing mechanism.

At present, lawnmowers of this type employ belt drives both to the mower blade and to the drive wheels. In these current mowers, each wheel is belt driven and provided with a clutch and individual wheel brake which are intimately linked. The belts wear out at frequent intervals and the drive thus has a high maintenance rate. The belts also tend to slip when the grass is wet. Changing speeds requires both belts be disengaged by squeezing hand calipers found on each handle bar. A speed selector control must then be adjusted to effect speed change. Because these actions take considerable time to accomplish, the operator generally disregards making speed changes. This, however, renders precision mowing near obstacles difficult or impossible. Consequently, an intolerable amount of follow-up mowing with a hand mower or trimmer is usually required. The operator must also release his grip on the steering controls when making various machine adjustments which can and often does lead to an accident.

These same hand calipers when squeezed to their maximum position engage a brake which is used for turning purposes. Because the hand calipers are spring-controlled, they require considerable hand pressure to engage which is extremely tiring. Almost continuous squeezing is required to keep the mower steering in the proper direction due to the direct drive, non differential type axle.

Previous walk-behind mowers generally do not have a reverse speed. Because of the excessive weight of these mowers, and their uneven weight distribution, manually backing the mower is extremely tiring on the operator and oftentimes dangerous.

Also, in current mowers, a large percentage of total machine weight is carried on the front wheels in order to keep the mower deck from bouncing. As a consequence, the machine weight carried on the drive axle is less than desirable for optimum traction, especially while operating on grades.

OBJECTS AND SUMMARY OF THE INVENTION

It is an object of this invention to provide a self-propelled lawnmower which avoids the drawbacks of the prior art.

It is a more specific object of this invention to provide a self-propelled mower with a transmission having both a forward and a reverse direction, and permitting infinitely variable speed from a reverse speed, through neutral, to a maximum forward speed.

It is a more specific object of this invention to provide a self-propelled mower with a variable speed, reversing transmission that can be engaged by means of a control device immediately adjacent to the handle bar so that the operator can make speed and direction adjustments without moving his hand from the handle bar. Being able to keep his hand on the handle bar allows the operator to continue to steer the machine by engaging the wheel disc brake, or using operator weight on the handle bars, while at the same time making speed or forward-reverse changes by working the hydrostatic control device.

It is another object of this invention to provide a self-propelled mower with an oil bath gear drive (differential) intimately connected to the variable speed hydrostatic transmission, permitting constant power distribution to both drive wheels, thereby permitting the mower to track straight.

The differential also permits the operator to make directional steering changes by applying body pressure to the handle bars without having to solely rely on the individual wheel disc brakes.

It is another object of this invention to provide a mower with an inherent drive system which is not affected by moisture so that the mower is unable to propel itself in wet conditions.

It is yet another object of this invention to provide a mower with its center of gravity situated at about the axle of the rear drive wheels, to provide maximum traction. At the same time, the operator must still be able to easily raise the deck by providing body pressure to the handles, and the mower must retain enough weight on the front wheels to keep the mower deck from bouncing.

In accordance with an aspect of this invention, a self-propelled lawnmower has a mowing deck that supports one or more mowing blades. A pair of drive wheels are rotatably supported in a power deck located behind the mowing deck. Drive linkages convey power from an engine mounted upon the power deck to the rear drive wheels and also to a blade drive system for rotating the mowing blades. An operator position is situated rearward of the drive wheels. The mower includes a handle arrangement behind the drive wheels with operator controls mounted thereon for selectively controlling the speed and direction of the drive wheels. In the mower of this invention, the drive train includes a hydrostatic transmission that has an input shaft driven by the engine, an output shaft arranged to turn the drive wheels, and a control shaft that is rotated to control the ratio of the output shaft speed to the input shaft speed in a continuous range of speeds from reverse, through neutral, to maximum forward speed. The operator controls include a transmission control lever that is connected, for example, via a cable, to the control shaft of the hydrostatic transmission, so that the operator can move the control shaft of the hydrostatic transmission to select a desired drive wheel speed without removing his hand from the steering handle. In a preferred embodiment, the input and output shafts of the hydrostatic transmission are horizontally disposed, and the control shaft is vertically disposed. A control lever for the hydrostatic transmission includes a C-shaped member that is connected at one end to the control shaft, with a control cable being connected between the control handle nd the C-shaped member. A cooling fan can be mounted on the input shaft of the hydrostatic transmission for air cooling the same. The drive wheels are preferably connected to the hydrostatic transmission through a differential gear drive system having differential right and left output shafts that serve as axles on which the drive wheels are respectively mounted. These output shafts are provided with independent right and left disc brakes, with separately actuated operating handles, so that the operator can, if needed, brake the wheels independently for precision steering of the mower.

The engine is mounted with its center of gravity disposed rearward of the drive wheel shaft, to serve as a counterweight or counterpoise to balance the weight of the mowing deck. Consequently, the mower center of gravity is disposed at or close to the rear wheel axle. This aids traction significantly and enhances steering of the machine.

The above and many other objects, features, and advantages of this invention will be more fully understood from the ensuing detailed description of a preferred embodiment, which is to be considered in connection with the accompanying drawing.

DETAILED DESCRIPTION OF A PREFERRED EMBODIMENT

Figure 1:
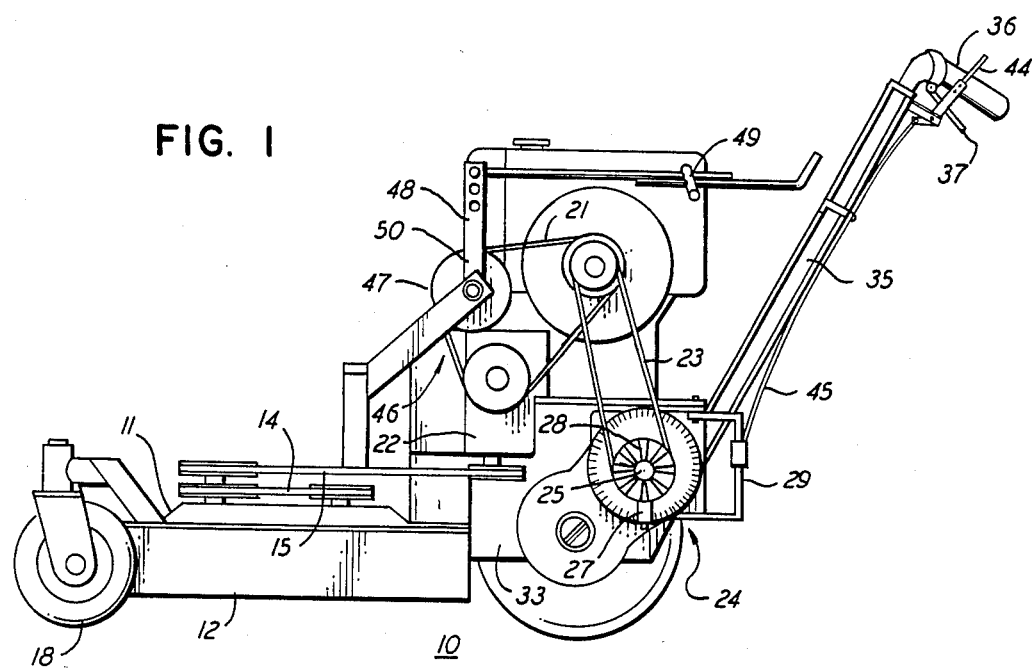
FIG. 1 is a side elevational view of a walk-behind self-propelled power lawnmower according to a preferred embodiment of this invention.
Figure 2:
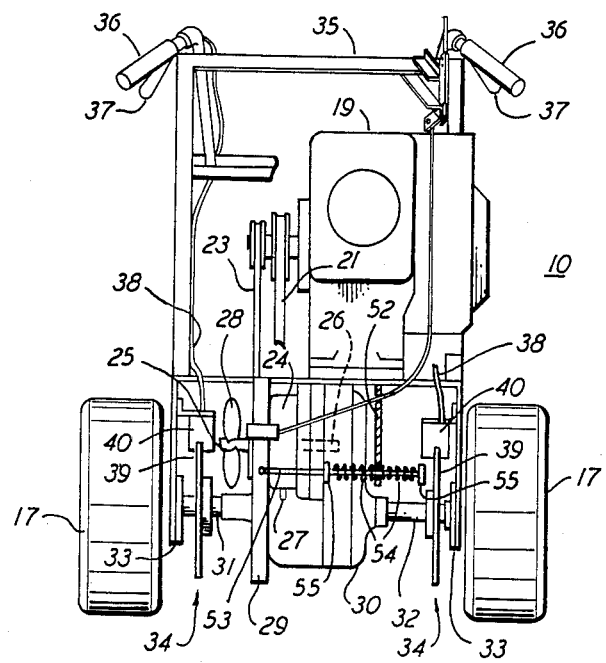
FIG. 2 is a rear view, partly cut away, of the lawnmower of this embodiment.
Figure 3:
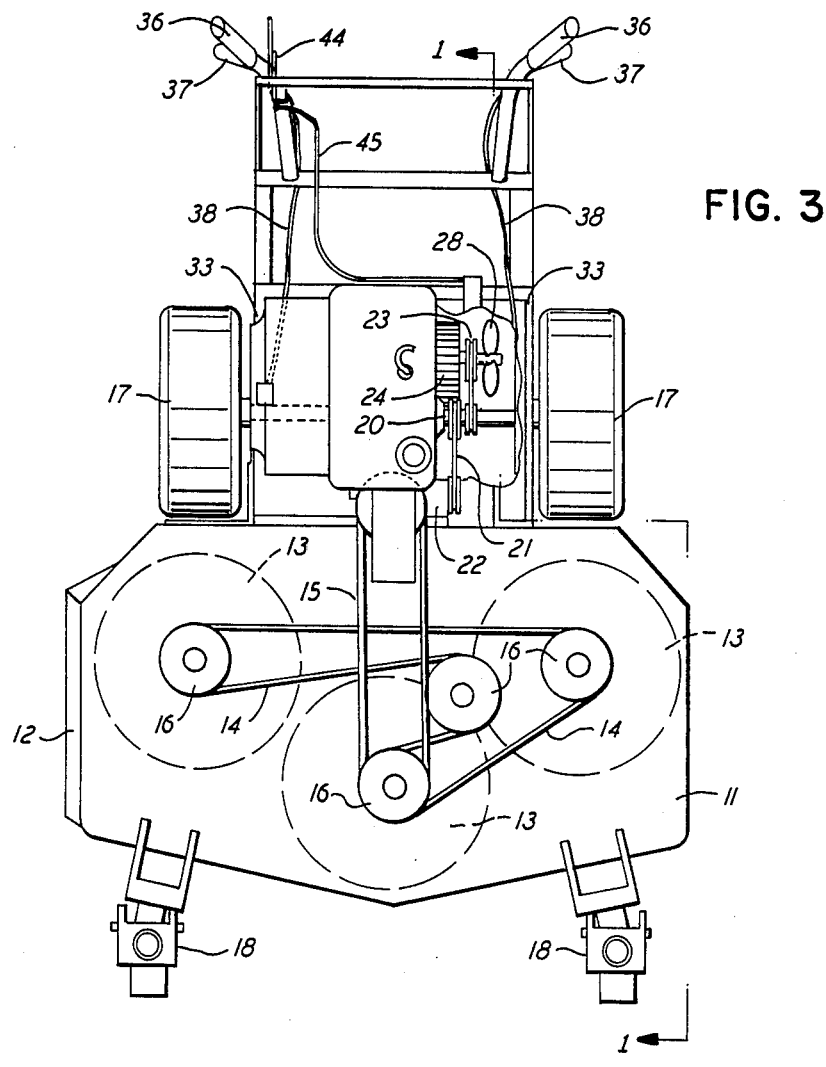
FIG. 3 is a top plan view of the lawnmower of this embodiment.

With reference to FIGS. 1-3 of the drawing, a walk-behind power lawnmower 10 is offered as an example to illustrate the principles of this invention.

The walk-behind rotary self-powered lawnmower 10 has a mowing deck 11 and a power deck 33 located behind the mowing deck. The mowing deck is surrounded by a safety skirt or shroud 12, and contains three rotary blades 13, shown schematically in FIG. 3. The blades 13 are linked together by a belt drive 14, and receive power by means of a primary belt drive 15, with belt drives 14 and 15 travelling over a system of pulleys 16 associated with the blades 13.

A pair of drive wheels 17 are here shown with large-diameter tires, preferably 16×6.50 size, and are rotatably supported in the power deck. A pair of front casters 18, with foam-filled maintenance-free tires, are mounted forward of deck 11.

A gasoline engine 19, here an industrial grade cast iron engine of 10-18 horsepower, is mounted above the power deck. Its center of gravity is situated aft of the drive wheels 17. In this embodiment, the weight of the engine 19 serves as a balance or counterpoise for the mowing deck assembly. This enables the mower 10 to be more heavily constructed than commercial mowers of like size, without loss of operator control, and without placing an excessive amount of weight on the forward casters 18.

Balancing the mower 10 more or less about the drive wheel axle gives it advantages not only in steering and traction, but also in its ease of lifting the mowing deck 11 when necessary to perform maintenance or mount curbs and the like by simply pushing down on the handle section.

The engine 19 is of the horizontal type, with a horizontal output shaft 20 disposed over the power deck. A first belt drive 21 connects the output shaft 20 to a 90 degree converter unit 22. The latter has a horizontal input shaft and a vertical output shaft which drives the primary belt 15 to provide motor power to the blades 13. Thus, the only connection between the power deck and the mowing deck is belt 21. Accordingly, many of the aligning and mounting problems found in other mowers are avoided. The converter unit is secured to the back of the mower deck and provides added weight to the front section of the lawnmower for better traction and increased stability.

A second belt drive 23 is also mounted on the motor output shaft 20 and is connected to a hydrostatic transmission 24 that is associated with the rear drive wheels 17.

The hydrostatic transmission 24 is a hydraulic transmission with an input shaft 25 that is connected to a variable-displacement radial-ball piston hydraulic pump. Although not shown, a fixed-displacement-radial ball piston hydraulic motor is also connected to an output shaft 26, a system of valves and hydraulic conduits all contained in the transmission housing, and a control shaft 27 which controls the mode of the variable displacement pump, and thus controls the ratio of output shaft speed to input shaft speed. In this embodiment, an Eaton Model 7 hydrostatic transmission is preferred. A fan 28 is situated on the input shaft to draw cooling air over the housing of the transmission 24.

This hydrostatic transmission 24 permits an operator to control speed and forward/reverse direction of the rear wheels 17 by means of a single operating lever, and without requiring clutching.

A C-shaped actuator lever 29 is mounted on the mower 10 with a lower end thereof on the control shaft 27.

Figure 4:
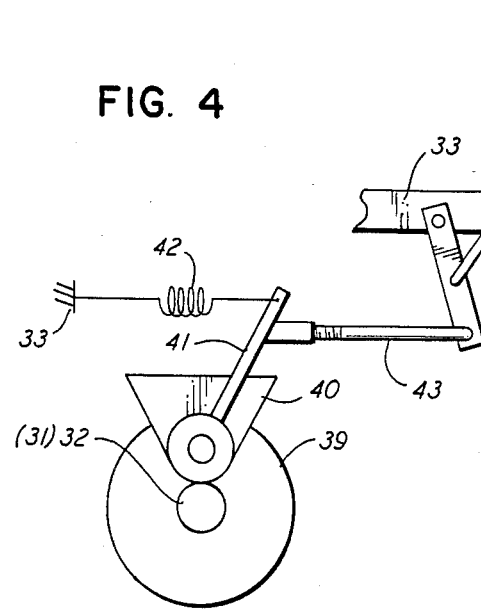
FIG. 4 is a schematic view of a disc brake assembly employed in the lawnmower of this invention.

A gear differential mechanism 30 is connected to the output shaft 26 of the transmission 24, and has a right differential axle and left differential axle 32, as outputs thereof, and on which the wheels 17 are respectively mounted. These axles 31 and 32 are journalled in the power deck located behind the mowing deck 11. A pair of disc brakes, as generally shown in FIG. 4, are respectively mounted on the axles 31 and 32 inboard of the power deck side walls. The disc brakes 34 will be described in detail below.

A handle section 35 disposed rearward of the wheels 17 has right and left hand grips 36 for the operator, with respective right and left brake levers 37 mounted thereon so that the operator can operate the brakes without releasing the hand grips. These levers 37 are coupled by respective cables 38 to the disc brakes 34. On each axle 31,32 there is a brake disc rotor 39, with a respective pad assembly 40 mounted on the sidewalls of the power deck. As shown in FIG. 4, an actuator lever 41 mounted on the pad assembly 40 brings the disc brake pads (not shown) into contact with the associated rotor 39. A return spring 42 biases the lever so that the pads are normally out of contact with the rotor 39. A clutch linkage 43 operatively couples the associated brake cable 38 with the actuator lever 41.

Also mounted on the handle section, near one of the grips 36, is a transmission control lever 44, which is connected by a control cable 45 to the C-shaped actuator lever 29. Using only this transmission lever 44 the operator can simply regulate the speed and direction of rotation of the hydrostatic transmission 24.

The blades 13 are engaged or disengaged with the motor 19 by means of an idler assembly 46, as best shown in FIG. 1, and which is associated with the first drive belt 21. This idler assembly 46 includes an idler wheel 47 mounted on a clutch lever 48 which has associated therewith an operator-actuated clutch rod 49. The operator draws the rod 49 towards him or her to disengage the blade 13, and pushes the rod 49 forward to engage them.

As mentioned previously, the mower can be constructed entirely of heavy duty materials, because the mower is so much easier to control than previous mowers of similar type, notwithstanding its greater weight. For greater safety and ease of operation, the control lever 44 for the transmission 24 is located immediately adjacent to the steering handle grip 36 so that the operator can adjust the drive wheel speed without moving his or her hand from the steering handle 35. The lever 44 is moved forward to adjust the mower speed from neural to forward. If the lever 44 is moved further forward, the mower 10 travels faster. The precise speed desired for mowing conditions can be set with the infinitely variable speed hydrostatic transmission 24 simply by adjusting the position of lever 44 as appropriate. Similarly, by moving the lever 44 to the rear, the mower 10 is caused to travel in reverse at the desired speed.

As shown in FIG. 2, a spring assembly 51 coupled to the frame 33 and the C-shaped lever 29 biases the drive control lever 44 towards a neutral position, so that when the lever 44 is released when in either a forward or a reverse position, the hydrostatic transmission automatically returns to a neutral position. Here, a fixed plate 52 is mounted on the power deck, and a rod 53 slides through this plate 52 and is attached to the lever 29. Relatively soft springs 54 bias against the plate 52 and against stops 55 on the rod 53. The springs 54 have a low spring rate, so the lever 44 is easily held at a desired position by the operator while the mower 10 is in operation.

Unlike other mowers, with this mower 10 it is not necessary to disengage any belts to effect a directional change. In other similar lawnmowers, a spring-actuated clutch, which disengages the belt drive, requires a strong gripping action to actuate, and because directional changes are frequent, steering with these belt-driven mowers can be exhausting and difficult work. The belts are also exposed to constant wear as they are clutched in and out of engagement thus requiring frequent replacement.

The present mower can be steered in either of two ways:

1. Because of the differential, the operator can simply apply body weight to the handle bars to make directional changes. This is impossible with present mowers because each wheel is differentially coupled to the drive shaft.

2. Each wheel is fitted with a disc brake which is engaged by means of a hand caliper on a corresponding handle. Engaging the disc brake is much easier than engaging the hand brake on other mowers because there is no spring-actuated clutch in the present brake linkage. Squeezing a selected hand caliper to engage one of the disc brakes results in an almost effortless turn toward the braked wheel side of the machine.

The operator can change speeds and engage the wheel brakes simultaneously for the sharpest possible corners. Because of the excellent control over the mower 10, an operator can trim close to walls or plantings. This precision in mowing eliminates most of the trimming and follow-up hand mowing that is required when other mowers are employed. Also, because of its steering precision, a much wider mowing deck can be employed than with current mowers, which further reduces mowing time and operator fatigue.

Because there are no belts associated with the rear drive wheels, or disposed beneath the mowing deck 11, moisture will not affect the drive linkages or slow down the mower operation. The heavy duty hydrostatic transmission 24 and differential 30 require little maintenance, and exhibit long life. When servicing is required, only simple hand tools and basic mechanical skills are required, and routine maintenance would require much less time than is needed for belt-driven mowers. If the mowing deck must for some reason be removed, the drive belt connecting it to the engine can be easily detached and reinstalled without difficulty.

The mowing machine of this invention is made much heavier than conventional machines of the same size and its weight is centered further to the rear than conventional mowers. Also, because of the heavier engine used here, considerably more traction is provided to the rear drive wheels (the machine is about 100 pounds heavier than conventional mowers of the same size). Because of the increased weight, the front of the machine is not liable to bounce; the conventional mowing machines must keep the center of gravity well forward of the drive wheels so that the front wheels and mower deck do not bounce off the ground as the mowing machine travels along. If a mowing machine of the conventional design were weighted in the fashion of this mowing machine, so as to provide similar increase in traction, the weight on the rear wheels would be detrimental to operation because of the belt drive to the rear wheels. Additional weight would only serve to make the belts tend to slip all the more in wet conditions. Also, because of their rather primitive, non-differential drive system, adding weight to the conventional mowing machines would make them even more difficult to control and to steer.

While the invention has been described in detail with reference to the structure disclosed herein, it is not confined to details set forth and this application is intended to cover many modifications and variations as may come within the scope of the following claims.

What is claimed is:

1. A self-propelled mower that includes a front mowing deck housing a blade assembly containing one or more movable blades, a rear power deck containing an engine, a pair of drive wheels and a power train coupling the engine to the drive wheels, wherein the engine has a horizontally disposed output shaft positioned over the power deck, and power take off means for connecting the blade assembly to said output shaft, handle bar means attached to the back of the power deck for steering the drive wheels, said power train further includes a hydrostatic transmission having an output shaft means connected to the engine and a drive shaft means connected to the drive wheels and a speed regulator to set the speed ratio of the drive shaft means to the input shaft means within a continuous range from reverse through neutral, wherein the drive shaft means is idle, to maximum forward, a control member positioned on the handle bar means that is connected to the regulator by a speed control linkage for setting the regulator at any desired positioned within the continuous range so that the operator can select a desired drive wheel speed without releasing the handle bar means or uncoupling the transmission from the engine, and wherein the power take off means further includes a gear box mounted upon the mower deck with a horizontal input shaft that is coupled to the horizontally disposed output shaft of the engine, and with an output shaft, means connecting said gear box output shaft to the blade assembly, and clutch means for releasably coupling the engine output shaft to the gearbox input shaft.

2. The mower of claim 1 wherein said power train further includes a differential drive coupled to the hydrostatic transmission and right and left drive shafts connecting the drive wheels to the differential drive.

3. The mower of claim 2 further including independent disc brake means actuable independent of said clutch means and associated with each drive shaft for independently braking each drive wheel.

4. The mower of claim 3 that further includes a pair of operator actuated brake levers positioned on the handle bars, brake linkage connecting each brake lever to one of the disc brake means so that the operator can actuate each brake separately without releasing the handle bars to either steer or slow the speed of the mower.

5. The mower of claim 1 wherein the engine is mounted upon the power deck with its center of gravity to the rear of the drive shaft means to counter balance the weight of the mowing deck whereby the operator can raise the mowing deck by applying a slight down pressure on the handle bar means.

6. The mower of claim 1 that further includes a fan for drawing cooling air over the hydrostatic transmission.

7. The mower of claim 1 that further includes caster wheels mounted upon the front of the mowing deck.

8. The mower of claim 1 wherein said blade assembly includes a plurality of rotary blades with associated drive pulleys, and a blade drive belt passing over said drive pulleys to rotatably connect said rotary blades; and said power take-off means includes a primary belt separate from said blade drive belt connecting the output shaft of the gear box to the blade drive belt.

9. The mower of claim 8 wherein said gearbox output shaft is vertical and said primary belt is disposed horizontally to connect said output shaft to a pulley of said blade assembly.

10. The mower of claim 9 wherein said blade drive belt and primary belt are situated above the moving deck thus to position the belt away from grass being mowed to avoid slippage when the grass is wet.

11. A self-propelled mower that includes:
a front mowing deck housing a blade assembly containing one or more movable blades,
a rear power deck containing an engine, a pair of drive wheels and a power train coupling the engine to the drive wheels,
power take off means for connecting the blade assembly to the power train,
handle bar means attached to the back of the power deck for steering the drive wheels,
said power train further including a hydrostatic transmission having an input shaft means connected to the engine and a drive shaft means connected to the drive wheels and a speed regulator to set the speed ratio of the drive shaft means to the input shaft means within a continuous range from reverse through neutral, wherein the drive shaft means is idle, to maximum forward, and
a control member positioned on the handle bar means that is connected to the regulator by a speed control linkage for setting the regulator at any desired position within the continuous range so that the operator can select a desired drive wheel speed without releasing the handle bar means or uncoupling the transmission from the engine, including means biasing the speed control linkage to the neutral position of the regulator, so that the transmission automatically returns to a neutral position if the operator releases the control member.

12. The mower of claim 11 wherein said linkage includes a lever connected to the transmission speed regulator; and said biasing means includes a rigid member attached to said lever, a rigid plate mounted on the power deck having a passage through which said rigid member passes, and a pair of springs biasing said plate against stops on the rigid member.

* * * * *